UNITED STATES PATENT OFFICE.

JOHN COY, OF OSWEGO, NEW YORK, ASSIGNOR, BY MESNE ASSIGNMENTS, TO THE PARAGON PLASTER COMPANY, OF NEW YORK.

COMPOSITION OF MATTER FOR PLASTERING, &c.

SPECIFICATION forming part of Letters Patent No. 390,157, dated September 25, 1888.

Application filed February 11, 1888. Serial No. 263,713. (No specimens.)

*To all whom it may concern:*

Be it known that I, JOHN COY, of Oswego, in the county of Oswego, in the State of New York, have invented new and useful Improvements in Composition of Matter for Plastering and Analogous Uses, of which the following is a full, clear, and exact description.

This invention consists in a novel composition of matter forming a new material for plastering the inside of buildings, and also adapted to be molded into ornamental articles, which material possesses a sufficient degree of flexibility to render it more tenacious and more durable than the ordinary plaster hitherto used for such purposes.

In forming the said compound I use the following ingredients in about the proportions specified: one-third barrel of plaster-of-paris, one-sixth barrel of whiting, one-third barrel of sand, one-third barrel of sawdust, one-sixth pound of glue, one-sixth pound of Irish moss, one-third quart of molasses, and one-third ounce of tartaric acid.

The last four ingredients—viz., the glue, Irish moss, molasses, and tartaric acid—constitute a restrainer for checking the setting action of the compound.

I mix the said ingredients in the following manner: I first reduce the said restrainer into liquid form by adding a sufficient quantity of water thereto, and, after thoroughly mixing the same, sprinkle the said liquid compound over the sawdust and dry the same. I then mix the plaster-of-paris and whiting in a dry condition and add this mixture to the mixture of glue, Irish moss, molasses, tartaric acid, and sawdust, and then add thereto the sand. All of said ingredients are to be thoroughly commingled, and are then in proper condition to be put up in suitable packages for storage or transportation. When it is to be used, it is to be mixed with sufficient water to render it plastic or of the required consistency for plastering with it the inside of buildings, said compound being specially adapted for the first coat of plastering. For the second coat of plastering the sawdust may be omitted in the compound, and the restrainer—viz., the glue, Irish moss, molasses, and tartaric acid, in slightly-reduced quantities—is to be sprinkled over the whiting and dried and mixed with the plaster-of-paris and sand.

The described composition is very cohesive and tenacious, and free from liability of cracking or being torn by nails driven into it.

No lime is employed in plastering, and thus any coloring-matter that may be mixed with the compound will not be affected.

Although the tartaric acid may be dispensed with in some cases, yet I prefer its use in nearly every instance.

The sawdust I prefer to have coarse.

What I claim is—

1. The within-described composition of matter, consisting of plaster-of-paris, whiting, sand, glue, and molasses, combined in the manner set forth.

2. The improved composition of matter, consisting of plaster-of-paris, whiting, sand, sawdust, glue, Irish moss, and molasses, combined in the manner herein described.

3. The improved composition of matter, consisting of plaster-of-paris, sand, whiting, glue, Irish moss, molasses, and tartaric acid, as specified.

4. The within-described composition of matter, consisting of plaster-of-paris, sand, whiting, sawdust, glue, Irish moss, molasses, and tartaric acid, combined as set forth.

In testimony whereof I have hereunto signed my name, in the presence of two witnesses, at Syracuse, in the county of Onondaga, in the State of New York, this 8th day of February, 1888.

JOHN COY. [L. S.]

Witnesses:
C. H. DUELL,
J. J. LAASS.